Figure 1:
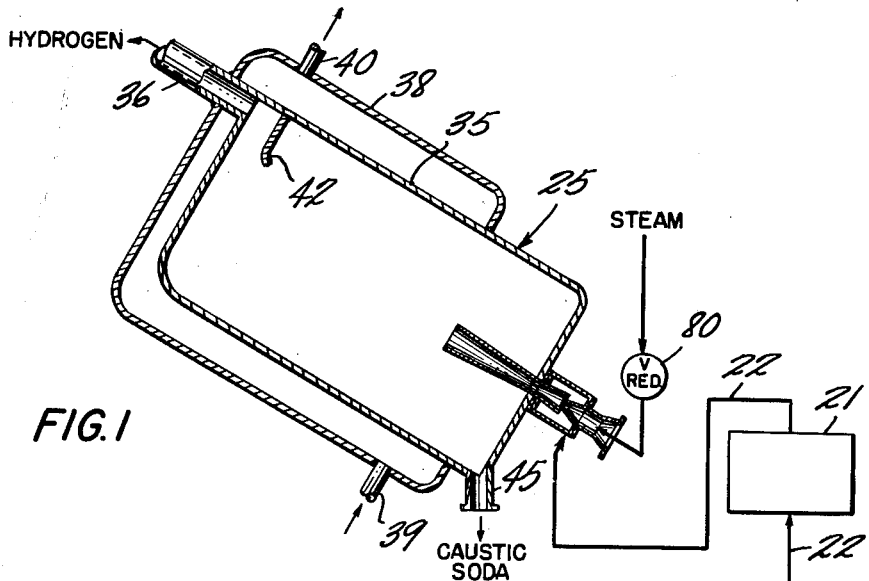

May 26, 1964  J. SZECHTMAN  3,134,645
METHOD OF PRODUCING CAUSTIC SODA
Filed March 8, 1961

INVENTOR.
JOSHUA SZECHTMAN
BY Riggs T. Stewart
ATTORNEY

United States Patent Office 3,134,645
Patented May 26, 1964

3,134,645
METHOD OF PRODUCING CAUSTIC SODA
Joshua Szechtman, Byram, Conn., assignor to Chlormetals Incorporated, New York, N.Y., a corporation of Delaware
Filed Mar. 8, 1961, Ser. No. 94,372
2 Claims. (Cl. 23—184)

This invention relates to the production of caustic soda, i.e. sodium hydroxide, and is more particularly concerned with the production of caustic soda in anhydrous form and with a high degree of purity.

Caustic soda is useful industrially for many well-known purposes and, for many uses, a substantially anhydrous caustic soda is required. Furthermore, there is also an important need for anhydrous caustic soda which has a high degree of purity and is free from contaminants usually found in commercial caustic soda. However, the production of anhydrous caustic soda, particularly in pure form, has presented a serious problem and has involved many processing steps.

Caustic soda is conventionally produced by the electrolysis of an aqueous solution of sodium chloride, and the product is a relatively dilute aqueous solution. It also contains impurities. When it is produced in electrolytic cells of the diaphragm type, a material amount of undecomposed sodium chloride remains in the solution, even after further processing, as in evaporator equipment. The presence of this impurity is highly objectionable when the caustic soda is used in producing many products, e.g. rayons. When caustic soda is produced in electrolytic cells of the mobile mercury cathode type, a higher degree of purity is obtained, especially if purified water is employed in the amalgam decomposer, but even when the water is absolutely pure, the caustic solution produced contains traces of mercury. Because of this, the use even of mercury cell caustic soda is objectionable in the production of many products. An example is the production of cigarette paper, where any trace of mercury is highly objectionable.

Furthermore, when the caustic soda is required to be in anhydrous form, as for convenience in storage and for ocean shipment, it becomes necessary to remove the water by an elaborate process, generally requiring the use of direct-fired caustic pots. In such further processing, the impurities are concentrated in the anhydrous caustic soda obtained.

Other proposals have involved the production of sodium as an alloy of fused lead, and the treatment of such lead-sodium alloy with steam. An example of this type of operation was the production of anhydrous caustic soda in the electrolytic cell designed by Acker (U.S. Patent No. 649,565). This procedure resulted in the direct production of caustic soda in anhydrous form, but it also resulted in the introduction of lead oxide resulting from the reaction of the steam upon the molten lead, and this impurity was just as objectionable as traces of mercury and undecomposed sodium chloride. In addition, significant amounts of lead became dissolved in the caustic soda thus produced and removal of this dissolved lead is itself a major problem.

There is, therefore, an important need for a process which can effectively produce anhydrous caustic soda without the employment of an elaborate procedure, such as the direct firing of a caustic solution in caustic pots, and which will also provide an anhydrous caustic soda which is substantially in pure form.

It is, accordingly, an object of this invention to provide a proces for producing anhydrous caustic soda which avoids the drawbacks and disadvantages resulting from the necessity of removing water from aqueous caustic soda solutions.

It is a further object of the invention to provide a process of the character indicated by means of which the anhydrous caustic soda, so produced, will be free from objectionable impurities.

In accordance with this invention, there is formed an alloy of sodium and lead, the alloy is conducted to a vaporizer wherein at least part of the sodium is vaporized from the alloy, and the sodium vapor is then introduced into a reaction chamber and reacted with steam to form the desired caustic soda. In the first step of the process of this invention, wherein there is formed the alloy of molten lead and metallic sodium, the alloy may comprise any proportion of lead and sodium inasmuch as lead will absorb sodium in all proportions. This alloy may be formed by causing lead and sodium to be melted together and mixed, as is generally the procedure in preparing a lead-sodium alloy for the production of tetraethyl lead. The alloy of lead and metallic sodium may also be formed by electrolyzing fused sodium chloride in a cell in which the cathode is molten lead and the sodium, liberated in the electrolysis reaction, becomes absorbed and dissolved in the lead to form a molten lead-sodium alloy which leaves the electrolysis zone at a temperature of approximately 850° C. Such a cell is described, for example, in my co-pending application Serial No. 699,979, filed December 2, 1957 (now U.S. Patent No. 3,104,213, dated September 17, 1963). This application is a continuation-in-part application of said application Serial No. 699,979.

In the second step of the process, the molten alloy of lead and sodium is further heated a relatively slight amount to effect vaporization of some of the sodium. However, such vaporization of some of the sodium from the molten lead alloy may also be effected by creating a partial vacuum in the vaporizer without further application of heat. In either method, if complete vaporization of the sodium is avoided, leaving a substantial amount, e.g. about half, of the sodium in the alloy, that part of the sodium which has passed off in vapor form will be substantially pure and free from lead. Furthermore, that part of the sodium not vaporized will not be wasted because the remaining lead-sodium alloy can be recycled to the vaporizer and reprocessed in like manner after more sodium has been added to it by one of the procedures referred to above.

Although not essential, it is recommended that the sodium vapor from the vaporizer be conducted to and passed through an entrainment eliminator to remove any trace of particles of lead which may have been mechanically entrained in the vapor, e.g. a separator containing baffles, or a cyclone-type separator. This may be considered a third step of the process when employed.

In the final step of the process, the pure sodium vapor is brought into contact with controlled quantities of pure steam to produce the desired caustic soda of high purity, with hydrogen being produced as a by-product. The caustic soda will be in molten form, and can be conducted by gravity from the reaction chamber for further handling.

It is a feature of the invention that substantially anhydrous sodium hydroxide, including pure sodium hydroxide, can be produced directly without the need for separating contaminants and without the need for complex processing procedures.

It is another feature of the invention that substantially anhydrous sodium hydroxide can be produced in substantially quantitative yields.

Figure 2:
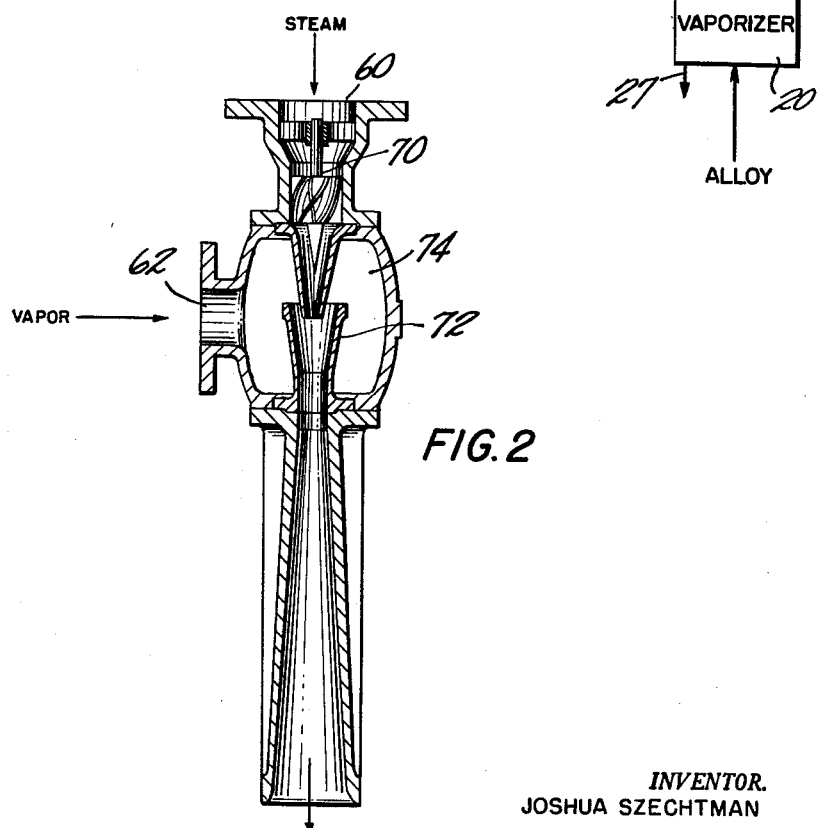

Other objects and features of the invention will be readily apparent from the following detailed description of illustrative embodiments thereof and from the accompanying drawing wherein, FIG. 1 is a cross-sectional view, partly in elevation, of a reaction chamber and associated apparatus units suitable for carrying out the process of this invention; and FIG. 2 is a cross-sectional view, on an enlarged scale, of the jet injector shown in FIG. 1.

Referring to the drawing, the lead-sodium alloy is conducted in molten form to a vaporizer 20, which may be of any desired form but is suitably a simple distillation unit conveniently heated by means of gas, oil or the like in conventional manner. As indicated previously, vaporization of sodium may be effected without further application of heat to the molten alloy by reducing the pressure in the vaporizer 20. This is effected by connecting the vaporizer to any conventional vacuum source. Preferably, an entrainment eliminator 21 which, as mentioned, may either be a baffled chamber or a cyclone-type separator, is associated with the vaporizer to avoid any possible mechanical entrainment of lead when the metal is vaporized from it. The alloy arriving at the vaporizer is already at an elevated temperature, i.e. at least above its melting point. In the case of a sodium-lead alloy coming from an electrolysis cell such as described in my said U.S. Patent the alloy will have a temperature of about 850° C. and only a slight additional amount of heat needs to be added to effect the desired vaporization, i.e. to raise it to a temperature of about 890° C. in the case of vaporization at atmospheric pressure.

The sodium vapors enter the vapor conduit 22 and are conducted to the hydrating chamber 25 for conversion to sodium hydroxide. It is not, of course, necessary to vaporize all of the product metal from the alloy and, indeed, it is not desired to do so but it is readily possible to vaporize at least about 25% of the sodium content of the alloy and, preferably, not more than about 50% of the sodium content. After the alloy stream has passed through the vaporizer and has had a large proportion of its sodium content vaporized away, it can be conveyed through the conduit 27 for reuse in forming new alloy for subsequent vaporization. For example, it can be conveyed to the electrolytic cell for the electrolysis of additional amounts of sodium salt.

The alloy subjected to vaporization may have any desired content of sodium, and lead and sodium form alloys of a wide range of proportions, but preferably the sodium content is at least about 10% and such an alloy can be readily produced by the process of my said U.S. patent.

The hydrator chamber 25 is of any convenient form but, as seen in FIG. 1, it is advantageously in the form of a cylindrical chamber member 35 having an outlet 36 and surrounded with a cooling jacket 38 into which any suitable heat transfer medium, e.g. water, may be circulated through circulating conduits 39 and 40. Interiorly the reaction chamber is provided with a baffle 42 adjacent the outlet 36. This outlet, through which hydrogen is removed, is suitably connected to an exhaust collector (not shown) and the exhaust gas may be passed into water to eliminate any entrained product from it before it is discharged into the atmosphere or collected.

As the product is formed in the reaction chamber 25, it will fall to the bottom wall of the chamber, which slopes downwardly toward a product outlet 45 which, by suitable conduits (not shown), can conduct the product to storage or subsequent use.

As shown in FIG. 1, there is provided directly in the reaction chamber an inlet device in the form of a jet injector in which the entering sodium vapors and the entering steam are mixed and then introduced into the reaction chamber. Thus, the inlet device has an axial inlet 60 for the steam, which is suitably supplied under positive pressure from any convenient source, and a lateral inlet 62 connected to inlet piping 22 leading from the sodium vaporizer. Any jet injector construction is generally suitable for the purposes of this invention, but there is shown in FIG. 2 a jet injector which is particularly effective. As seen in FIG. 2, the inlet 60, into which the steam is introduced, is provided with a freely rotatable bladed rotor 70 which rotates in response to the movement of the entering gaseous stream and serves to give it a swirling motion. The inlet channel terminates in a converging frustoconical portion which discharges into an outlet conduit 72 having a converging inlet portion and a diverging outlet portion. The junction between the converging end of the inlet and the converging portion of the outlet is found in a chamber 74 communicating directly with the lateral inlet 62. As the steam passes axially through the device, the suction created draws the sodium vapors into the chamber 74 and effects intimate admixture between the two entering streams so that a mixed stream is injected into the reaction chamber.

The steam may be supplied at any desired pressure and a pressure-reducing valve 80 is suitably provided in the steam line in order to control the flow of the steam. To produce caustic soda, stoichiometric quantities of steam and sodium vapor are introduced into the reaction chamber and such stoichiometric quantities are readily obtained and maintained by control of the reducing valve since the quantity of sodium vapor drawn into the reaction chamber by the steam will depend upon the pressure of the steam entering the axial inlet 60. In practice, the steam will suitably be introduced at a pressure of about 5 lbs. gage and will thus be relatively cool in relation to the temperature of the sodium vapor. The temperature of the reaction can vary over a wide range and, since the reaction itself is exothermic, the introduction of relatively cool steam has a moderating effect and helps to prevent the temperature from becoming excessive, thereby reducing the work that needs to be done by the coolant in the reactor jacket. As mentioned, the temperature in the reaction chamber 25 may vary widely and any temperature above the melting point of caustic soda is suitable. However, the reaction being exothermic, the temperature tends to rise and it is desirable from a practical standpoint to prevent excessive temperatures, e.g. temperatures above 1000° C.

As previously indicated, lead-alloys of varying sodium content may be employed but generally they will have a sodium content of about 10 to 50% by weight of the total alloy for best results.

In the case of sodium-lead alloys produced by electrolysis, the content of the alloy can be regulated by the current applied in the cell. Thus a lesser current will produce a lower sodium content and a greater current will produce an increased sodium content. Such variation in currents will be readily understood by persons skilled in the art.

As mentioned, hydrogen is produced as a by-product and is removed through the outlet 36 for recovery if desired or for venting to the atmosphere. In any case, the hydrogen stream is passed through a water trap (not shown) in order to remove any caustic soda which may be mechanically entrained with the hydrogen, and there is thus produced a dilute aqueous caustic soda solution which, of course, is a valuable product.

In a typical operation, a sodium-lead alloy containing 10% by weight of sodium is supplied to a vaporizer at a temperature of 850° C. and at the rate of 49.5 pounds per minute. In the vaporizer, the alloy is heated to 890° C. and half of its sodium content is vaporized to form sodium vapor at the rate of about 2.25 pounds per minute, to leave an alloy containing 5% sodium for recycling to the alloy-forming operation. This 2.25 pounds per minute of sodium vapor is combined with 1.765 pounds per minute of steam introduced at 5 lbs./sq. in. gage pressure to produce in the hydration chamber 3.85 pounds per minute of an hydrous caustic soda, cooling being effected to keep the temperature in the chamber below 1000° C. At the same time, there is produced 0.1 pound per minute of hydrogen.

It will be understood that various changes and modifications in addition to those indicated above may be made in the embodiments herein described and shown in the drawing without departing from the scope of the invention as defined in the appended claims. It is intended,

I claim:

1. A process of producing substantially anhydrous caustic soda from a molten sodium-lead alloy which comprises passing the molten sodium-lead alloy into a vaporizing zone while in molten heated form and directly evaporating the sodium from the lead alloy as a vapor of sodium, and, without prior condensation of said vapor, bringing said vapor into contact with a stoichiometric quantity of steam, said sodium vapor being brought into contact with said steam while said vapor is wholly and continuously in vapor form, said steam being at superatmospheric pressure, and introducing said steam and said sodium vapor into a hydration zone maintained at a temperature above the boiling point of sodium but at most about 1000° C.

2. The process of producing substantially hydrous caustic soda which comprises electrolyzing a fused sodium salt in the presence of a fused lead cathode by causing said fused salt and said fused lead to flow through a horizontal electrolysis zone, whereby to form a molten sodium-lead alloy, passing the alloy from the electrolysis zone into a vaporizing zone while in molten heated form and directly evaporating the sodium from the alloy as a vapor of sodium metal, the amount of said sodium vaporized from said alloy being at most about 50% of the sodium content of the alloy, and, without prior condensation of said vapor, bringing said vapor into contact with a stoichiometric quantity of steam, said sodium vapor being brought into contact with said steam while said vapor is wholly and continuously in vapor form, said steam being at superatmospheric pressure, and introducing said steam and said sodium vapor into a hydration zone maintained at a temperature above the boiling point of sodium but at most about 1000° C.

References Cited in the file of this patent

UNITED STATES PATENTS

| 623,693 | Acker | Apr. 25, 1899 |
| 995,476 | McNitt | June 20, 1911 |
| 2,200,906 | Wood | May 14, 1940 |

FOREIGN PATENTS

| 14,254 | Great Britain | A.D. 1912 |
| 707,074 | Great Britain | Apr. 14, 1954 |
| 752,273 | Great Britain | July 11, 1956 |